Patented Oct. 8, 1929

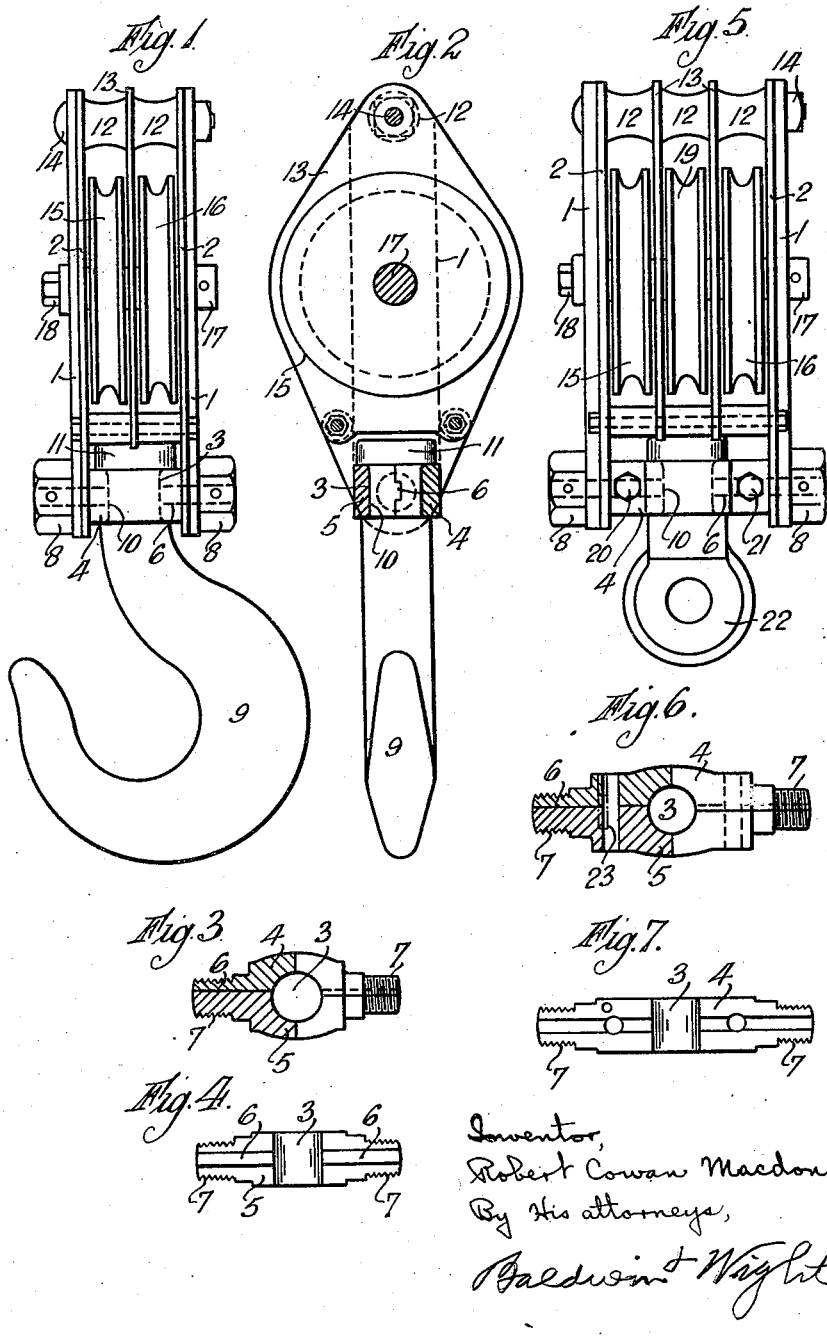

1,730,433

UNITED STATES PATENT OFFICE

ROBERT COWAN MACDONALD, OF LONDON, ENGLAND

PULLEY BLOCK

Application filed December 3, 1928, Serial No. 323,370, and in Great Britain September 6, 1928.

This invention relates to improvements in pulley blocks, slings, lifting tackle generally and the like.

Heretofore it has been usual to form the crosshead of a pulley block or other lifting tackle in one piece, and to provide an aperture therein through which a shank on the hook or eye was passed, the shank in some cases being secured by screw threading the projecting part thereof to receive a nut, and in other cases, by riveting over the end of the shank. In either case, however, the hook or eye was liable to break away from the crosshead, either by shearing the screw threads or by fracturing the riveted portion of the shank. In the latter case, moreover, the riveting operation weakened the material of the crosshead.

In order to secure greater safety, the shank of a hook or eye or like member is, according to the present invention, formed in one piece with a thrust collar, and the crosshead is formed in sections adapted to be placed in position on the shank and adapted conjointly to engage the thrust collar, means being provided for securing the sections together.

In one way of carrying the invention into effect, the crosshead is divided along a plane or planes passing through the shank receiving aperture and parallel with or containing the axis of said aperture, the arrangement being such that the crosshead sections can be placed in position on the shank and then secured together.

In one form of construction, the crosshead is split longitudinally along a plane containing the axis of the shank receiving aperture. The two sections thus formed are provided at their outer ends with one half of a screw thread, the arrangement being such that when the sections are assembled, each end of the crosshead is provided with a complete screw thread adapted to pass through the cheeks or plates of the block and receive a nut which clamps them to the cheeks or plates. The hook or eye is preferably forged in one piece and the shank turned in a lathe to the required size.

The sections of the crosshead may, if desired, be interlocked with each other by means, such as a mortise or other convenient joint. In cases where the block is to be used for heavy duties, the sections may also be secured together by bolts or rivets which pass through the sections at an angle (preferably a right angle) to the plane along which the crosshead is divided.

The invention is illustrated in the accompanying drawing in which Figures 1 to 4 are views of one form of construction, as applied to a double pulley block, Figure 1 being a side elevation, Figure 2 a vertical section, Figure 3 a detail view, one half being in section and the other half in plan, and Figure 4 a detail view of one portion or section of a crosshead. Figures 5 to 7 are views of a modified form of construction, as applied to a triple pulley block, Figure 5 being a side elevation, Figure 6 a detail view, one half being in section and the other half in plan, and Figure 7 a detail view of one portion or section of a crosshead.

Referring more particularly to Figures 1 to 4, 1, 1 are the side cheeks and 2, 2 the side plates of a pulley block; the lower ends of the cheeks and plates are spaced apart by a crosshead which is split longitudinally along a plane passing through a shank receiving aperture 3, the two sections 4 and 5 thus formed being interlocked by a projecting rib 6 on one extending into a corresponding groove formed in the other. The outer ends of the sections 4, 5 are each formed with one half of screw threaded shanks 7 and the complete shanks formed by the two sections pass through holes formed in the lower ends of the cheeks 1, 1 and the plates 2, 2, nuts 8 screwing on to the shanks 7 to secure the two sections of the crosshead to one another and to the cheeks and plates 1, 1 and 2, 2.

9 is a hook having a shank 10 received by the shank receiving aperture 3, and 11 is a thrust collar formed integral with the shank 10.

The upper ends of the cheeks and plates, 1, 1 and 2, 2, are spaced apart by spacers 12 located between the plates 2, 2 and inner plates 13, a bolt 14 passing through the plates and clamping them together. 15, 16 are pulleys, rotatably mounted on a pin 17 which passes through the cheeks 1, 1 and plates 2, 2, and 13, and is secured in position by a nut 18.

In operation, to assemble the crosshead and hook, the two sections 4, 5 are placed over the shank 10 and below the collar 11, and are then passed through the holes in the side cheeks and plates, and finally the nuts 8 are screwed on to the screw threaded shanks 7.

In the modification shown in Figures 5 to 7, which is applicable in cases where the crosshead is to be used for heavy duties, a third pulley 19 being provided, the sections 4, 5 are further secured together by clamping bolts 20, 21 which pass transversely through the crosshead, the hook 9 being replaced by an eye 22.

One section is provided with a dowel pin 23, and the other with a corresponding dowel hole to ensure that the sections, when assembled, shall be so placed face to face that the corresponding halves of the screwed shank shall be placed together.

What I claim is:—

1. The combination of a shank having a thrust collar formed integral therewith, a block formed in sections adapted conjointly to embrace the shank and to be engaged by the thrust collar, and means for securing the sections together.

2. The combination of a shank having a thrust collar formed integral therewith, a block having a shank receiving aperture and divided into sections along a plane which passes through the shank receiving aperture and which contains the axis of said aperture, said sections being adapted conjointly to be engaged by the thrust collar, and means for securing the sections of the block together.

3. The combination of a shank having a thrust collar formed integral therewith, a block having a shank receiving aperture and divided into sections along planes which pass through the shank receiving aperture and which are parallel with the axis of said aperture, said sections being adapted conjointly to be engaged by the thrust collar, and means for securing the sections of the block together.

4. The combination of a shank having a thrust collar formed integral therewith, a block formed in sections adapted conjointly to embrace the shank and to be engaged by the thrust collar, means for interlocking the sections, and means for securing the sections together.

5. The combination of a shank having a thrust collar formed integral therewith, a block having a shank receiving aperture and divided into sections along a plane which passes through the shank receiving aperture and which contains the axis of said aperture, said sections being adapted conjointly to be engaged by the thrust collar, means for interlocking the sections, and means for securing the sections of the block together.

6. The combination of a shank having a thrust collar formed integral therewith, a block having a shank receiving aperture and divided into sections along planes which pass through the shank receiving aperture and which are parallel with the axis of said aperture, said sections being adapted conjointly to be engaged by the thrust collar, means for interlocking the sections, and means for securing the sections of the block together.

7. The combination of a shank having a thrust collar formed integral therewith, a block formed in sections adapted conjointly to embrace the shank and to be engaged by the thrust collar, projection and groove means for interlocking the sections, and means for securing the sections together.

8. The combination of a shank having a thrust collar formed integral therewith, a block having a shank receiving aperture and divided into sections along a plane which passes through the shank receiving aperture and which contains the axis of said aperture, said sections being adapted conjointly to be engaged by the thrust collar, projection and groove means for interlocking the sections, and means for securing the sections of the block together.

9. The combination of a shank having a thrust collar formed integral therewith, a block having a shank receiving aperture and divided into sections along planes which pass through the shank receiving aperture and which are parallel with the axis of said aperture, said sections being adapted conjointly to be engaged by the thrust collar, projection and groove means for interlocking the sections, and means for securing the sections of the block together.

10. The combination of a shank having a thrust collar formed integral therewith, a block having screw threaded ends and formed in sections each having a portion of the screw threads, said sections being adapted conjointly to embrace the shank and to be engaged by the thrust collar, and nuts for engaging said screw threads to secure the sections together.

11. The combination of a shank having a thrust collar formed integral therewith, a block having screw threaded ends and divided into sections along a plane which passes through a shank receiving aperture formed in the block and which contains the axis of said aperture, each divided section having a portion of the said screw threads, the sections being adapted conjointly to be engaged by the thrust collar, and nuts engaging said screw threads to secure the sections together.

12. The combination of a shank having a thrust collar formed integral therewith, a block having screw threaded ends and divided into sections along planes which pass through a shank receiving aperture formed in the block, and which are parallel with the axis of said aperture, each divided section having a portion of the said screw threads, the sections being adapted conjointly to be engaged by the thrust collar, and nuts engaging said screw threads to secure the sections together.

13. The combination of a shank having a thrust collar formed integral therewith, a block having screw threaded ends and formed in sections each having a portion of the screw threads, said sections being adapted conjointly to embrace the shank and to be engaged by the thrust collar, projection and groove means for interlocking the sections, and nuts for engaging said screw threads to secure the sections together.

14. The combination of a shank having a thrust collar formed integral therewith, a block having screw threaded ends and divided into sections along a plane which passes through a shank receiving aperture formed in the block and which contains the axis of said aperture, each divided section having a portion of the said screw threads, the sections being adapted conjointly to be engaged by the thrust collar, projection and groove means for interlocking the sections, and nuts engaging said screw threads to secure the sections together.

15. The combination of a shank having a thrust collar formed integral therewith, a block having screw threaded ends and divided into sections along planes which pass through a shank receiving aperture formed in the block, and which are parallel with the axis of said aperture, each divided section having a portion of the said screw threads, the sections being adapted conjointly to be engaged by the thrust collar, projection and groove means for interlocking the sections, and nuts for engaging said screw threads to secure the sections together.

16. The combination of a shank having a thrust collar formed integral therewith, a block having screw threaded ends and formed in sections each having a portion of the screw threads, said sections being adapted conjointly to embrace the shank and to be engaged by the thrust collar, and means for securing the sections together, comprising nuts engaging said screw threads, and bolts which pass transversely through said sections.

17. The combination of a shank having a thrust collar formed integral therewith, a block having screw threaded ends and divided into sections along a plane which passes through a shank receiving aperture formed in the block and which contains the axis of said aperture, each divided section having a portion of the said screw threads, the sections being adapted conjointly to be engaged by the thrust collar, and means for securing the sections together comprising nuts engaging said screw threads and bolts which pass transversely through said sections.

18. The combination of a shank having a thrust collar formed integral therewith, a block having screw threaded ends and divided into sections along planes which pass through a shank receiving aperture formed in the block, and which are parallel with the axis of said aperture, each divided section having a portion of the said screw threads, the sections being adapted conjointly to be engaged by the thrust collar, and means for securing the sections together comprising nuts engaging said screw threads and bolts which pass transversely through said sections.

19. The combination of a frame, a shank having a thrust collar formed integral therewith, a block having screw threaded ends adapted to pass through apertures in said lifting frame, said block being formed in sections each having a portion of said screw threads and said sections being adapted conjointly to embrace the shank and to be engaged by the thrust collar, projection and groove interlocking means on said sections, and nuts for engaging the screw threaded ends to secure the sections together in position in the frame.

20. The combination of a frame, a shank having a thrust collar formed integral therewith, a block having screw threaded ends adapted to pass through apertures in said lifting frame, said block being formed in sections each having a portion of said screw threads and said sections being adapted conjointly to embrace the shank and to be engaged by the thrust collar, projection and groove interlocking means on said sections, nuts for engaging the screw threaded ends to secure the sections together in position in the frame, and additional means for securing the sections together, comprising bolts which pass transversely through the sections.

In testimony that I claim the foregoing as my invention I have signed my name this 16th day of November 1928.

ROBERT COWAN MACDONALD.